(No Model.)
A. GENTZSCH.
PROCESS OF THICKENING OILS.
No. 538,828. Patented May 7, 1895.
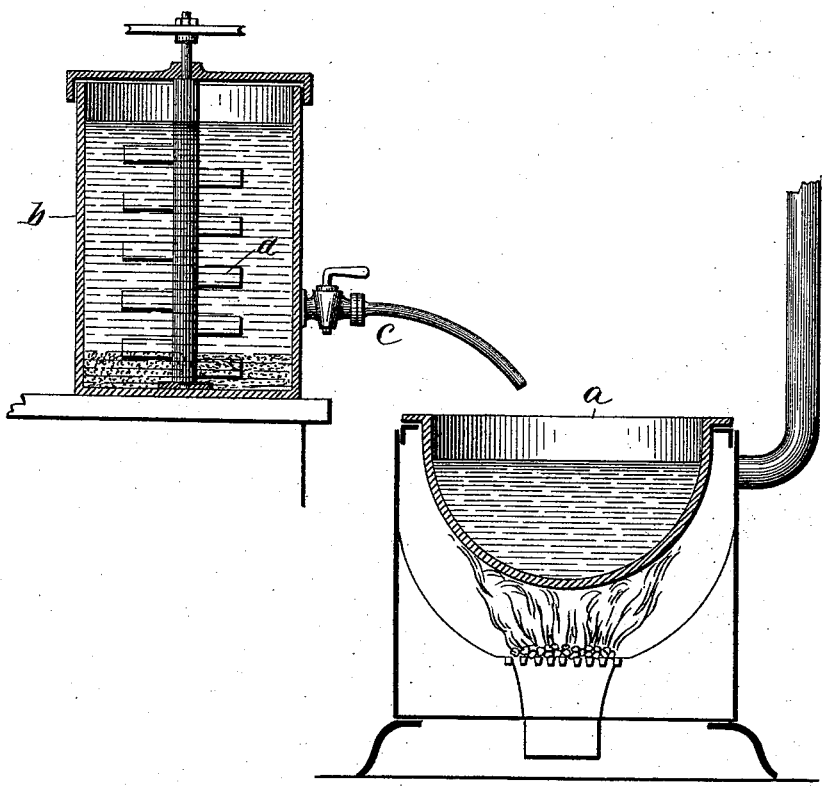
Witnesses:
Inventor:
Adolf Gentzsch
by Richards & Co
Att'ys.

UNITED STATES PATENT OFFICE.

ADOLF GENTZSCH, OF VIENNA, AUSTRIA-HUNGARY.

PROCESS OF THICKENING OILS.

SPECIFICATION forming part of Letters Patent No. 538,828, dated May 7, 1895.

Application filed October 5, 1893. Serial No. 487,220. (No specimens.) Patented in Germany August 23, 1893, No. 76,773.

*To all whom it may concern:*

Be it known that I, ADOLF GENTZSCH, residing at Vienna, in the Province of Austria and Empire of Austria-Hungary, have invented a certain new and useful Process of Thickening Oils or Fats, of which the following is a specification.

The invention has been patented in Germany, No. 76,773, dated August 23, 1893.

In order to thicken oils and especially non-drying oils and greases of vegetable or animal origin, they must be submitted to the following process: The oil or fat it is desired to thicken is introduced into a boiler of an appropriate construction and is heated at a temperature of about 200° centigrade. When it has reached that temperature water is allowed to flow into it from a corresponding elevation in small quantities or drop by drop while stirring the oil or fat from time to time. The drops of water that evaporate at 100° centigrade vaporize immediately by the heat of 200° of the oil and partly decompose the same and thicken it more and more so long as the drops continue to fall onto the heated oil.

Any degree of thickening can be obtained by letting this process go on for a longer or shorter time. If the water is allowed to drop quickly, two hours will be sufficient to thicken the oil sufficiently for insulating purposes.

In order to shorten the duration of the process it is advisable to add to the water carbonate of calcium, carbonate of magnesia or sulphate of lime, up to the point of saturation. It is also possible to add the same in excess but only the solution resulting from this addition is used. The stirring apparatus shown in the annexed drawing is very appropriate for this purpose. A receptacle $b$ through the tube $c$ of which the water can drop in a manner to be suitably regulated is disposed above the boiler $a$, in which the heated oil or fat is put. A stirrer $d$ is disposed in the interior of the vessel $b$ which serves by its rotation to secure the desired solution within the vessel—said stirrer being operated by the hand or by the means of a clock work. To form the solution the substances or the substance which must be added to the water is put on the bottom of the vessel and the conducting pipe $c$ is disposed over that deposit.

The regulating cock of the tube $c$, is preferably adapted so that notwithstanding it does not allow the drops to form a stream, the said drops follow each other in quick succession. The duration of the process can by so doing be reduced to one quarter of the time.

After the mass has attained the desired degree of thickening the flow of water is discontinued and in order to make sure that no water will remain in the oil vat the heating is continued for a time.

The mass resulting from this process can either itself alone or in combination with other materials be used to great advantage for various industrial purposes and especially as insulating material for electrical purposes.

I claim—

The herein described process of thickening oils and fats which consists in heating the same to about 200° centigrade and adding thereto, while hot, a saturated aqueous solution of carbonate of calcium or magnesia in graduated quantities, substantially as described.

In witness whereof I hereunto set my hand in presence of two witnesses.

ADOLF GENTZSCH.

Witnesses:
VICTOR TISCHLER,
L. BELMONT.